Patented Aug. 12, 1930

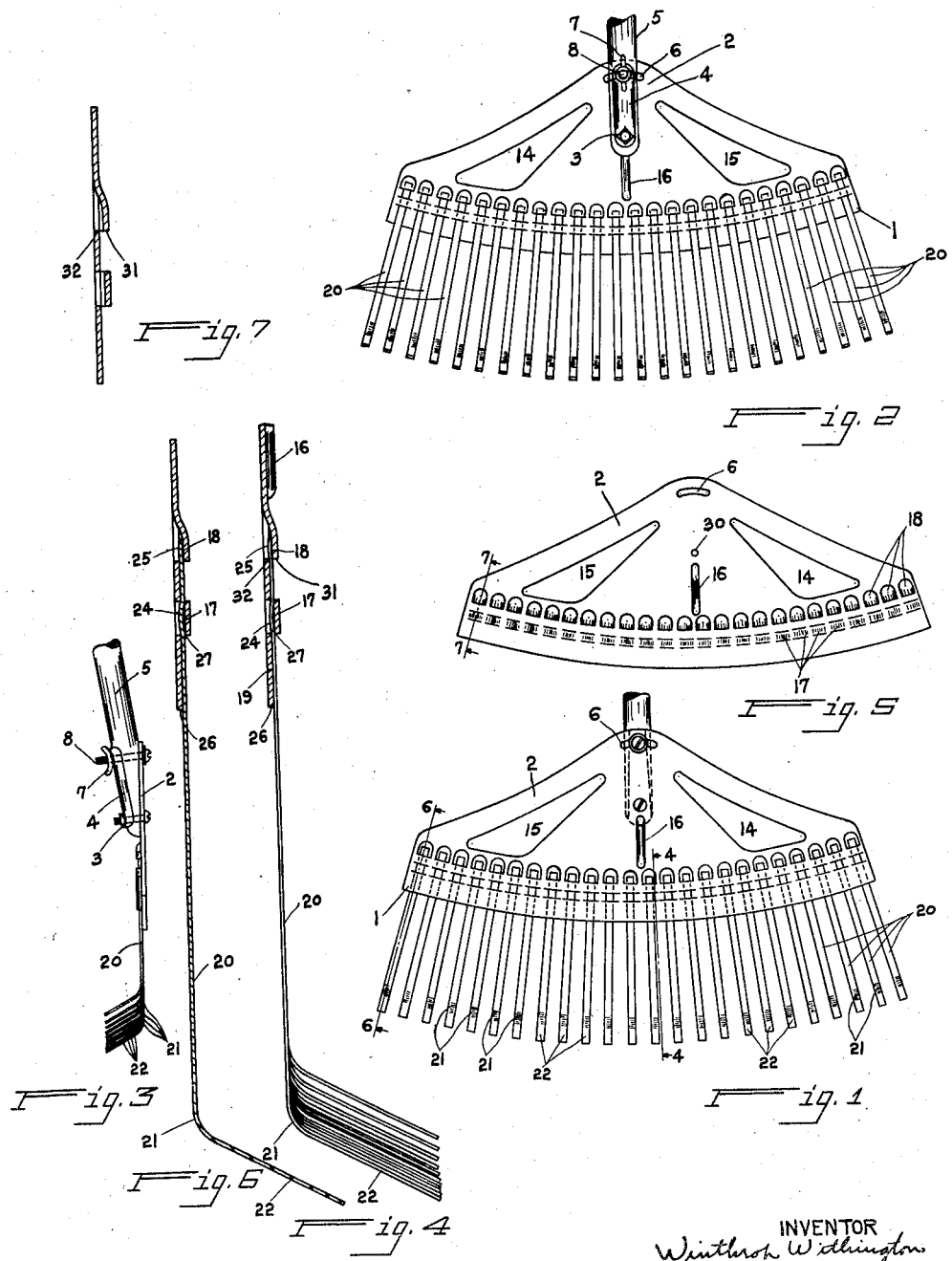

1,772,571

UNITED STATES PATENT OFFICE

WINTHROP WITHINGTON, OF CLEVELAND, OHIO, ASSIGNOR TO THE AMERICAN FORK & HOE COMPANY, OF CLEVELAND, OHIO, A CORPORATION OF OHIO

BROOM RAKE

Application filed May 22, 1926. Serial No. 110,859.

This invention relates to rakes, and particularly to a type of rake adapted to be employed for garden work, lawns and the like, and which are commonly known as broom rakes. Broom rakes have been employed for the purpose of raking leaves, straw, waste paper and the like from gardens and lawns, and it is characteristic of such rakes that they may be operated with a sweeping motion like that effected by a person operating an ordinary broom. It is found that a rake which may be so operated may be used with less fatigue to the operator, at the same time being efficacious in operation.

An object of the present invention is to provide an improved form of metallic broom rake.

Another object of my invention is to provide an improved broom rake having a spring steel head frame into which may be inserted flexible, preferably metallic, tines.

Another object of my invention is to provide an improved form of broom rake wherein the head is presented from the handle at such an angle as I have found advantageous in use.

Another object of my invention is to provide an improved form of broom rake wherein the head may have a plurality of different lateral angular adjustments relative to the handle.

Other objects of my invention and the invention itself will be apparent from the following description of an embodiment of my invention, in which description reference will be had to the accompanying drawings illustrating the same.

In the drawings:

Fig. 1 shows a plan view of an embodiment of my invention;

Fig. 2 shows a plan of the said embodiment viewed from the opposite side from the view of Fig. 1;

Fig. 3 shows an end elevation;

Fig. 4 shows an enlarged section taken on the line 4—4 of Fig. 1;

Fig. 5 shows a plan view of the head, per se, before attachment to the handle and prior to insertion of the tines within the head;

Fig. 6 is a section taken on the line 6—6 of Fig. 1; and

Fig. 7 is an enlarged section taken on the line 7—7 of Fig. 5.

Referring now to the different figures of drawing, wherein like parts are designated by like reference characters, at 1, I show a sheet of steel, or other metallic sheet material suitable for the purpose, having a preferably approximately arcuate forwardly disposed tine receiving portion, and at 2 the head is narrowed in rearward portions to receive a handle 4 adapted to be secured to the head by a pair of bolts 3 and 8 which pass through the handle 5 near its head end and through a circular opening 30 for the bolt 3 and an arcuate slot 6 for the bolt 8. In order to lighten the head, large openings 14 and 15 may be provided in that portion thereof disposed rearwardly of the tines 20 and lateral of the end of the handle.

At 4, I provide a reenforcing washer plate transversely curved to fit the rounded outer surface of the handle 5 and pierced near its ends, so as to admit the ends of the bolts 3 and 8. The bolts are headed on one end and are provided with nuts at their opposite ends for securely clamping the rake head by its portion 2, the handle 5 and the reenforcing washer 4 tightly together. The rake handle 5 is provided with an inclined face, Fig. 3, to contact with the portion 2 of the rake head, so as to project the rake head at an angle to the axis of the handle. This arrangement compensates in part, when the broom rake is in operation, for the deflection of the tines and head so that the point of contact between the ends of the tines and the ground may be approximately in a plane of the axis of the handle.

By providing an arcuate slot 6 for the reception of the bolt 8, the head 1 may be deflected laterally relative to the axis of the handle 5, so that one may use the rake with a sweeping motion at one side of the operator, the handle being disposed at an angle to the vertical, and at the same time the longitudinal axis of the head may be disposed more nearly in the vertical than the handle. The forwardly disposed portion of the head has a plurality of aligned loops 17 pressed from the body of the head sufficiently that the tines 20 may be projected between the head body and the inner surfaces of the loops also at 18 rearwardly of each loop 17, and arranged in preferably approximately arcuate form are a plurality of portions 18 pressed downwardly from the body of the head to provide slit tine receiving openings between the body of the head side portions, said portions being, however, united at their rearward portions to the head body, thus forming pockets for the tines projected through the slits provided by the loops 17 and which enter the pockets between the forward rib 31 of the portions 18 and the adjacent edge 32 of the head body, which is spaced therefrom by a thickness approximating the thickness of the tines. The tines 20 are preferably formed from spring sheet steel, of a hardness and temper such that the material thereof will not be brittle and subject to breakage, but, at the same time, so that the tines will be quite resilient, and when deflected and the deflecting pressure being removed will be restored to normal undeflected form. The dimensions of the tines, including the thickness thereof, will be chosen with relation to the nature of the work to be done by the rake. After the tines have been inserted through the slit passages provided for them in the head, comprising the tine embracing loops 17 and the pockets comprising the deflected portions 18 of the head, the head with the tines are placed in a press and the material of the loops and the pockets is forced more nearly into the plane of the head body, so that, as illustrated in Figs. 4 and 7, the tines will be bent as shown at 24 and 25. As shown in the drawing, this will accomplish engagement between the front inner edges 31 and 27 of the loop portions 18 and 17 respectively of the head body, and the portion of the tine projected through the slits intermediate said loop edges and the head body, immediately adjacent thereto, to laterally bodily deflect the portions 24 and 25 of the tines from the plane of the longitudinally extending portions of the tines intermediate their tips 22 and the forward edge 26 of the head. The head body 2 will be made of a metallic material sufficiently elastic to cause restoring of the loops and pocket portions to normal after the pressing operation just described, so that the deformation of the tines within the loops and pockets will be permanent, but the tines being resilient will resist the compressive force exerted by the bent portions 17 and 18 and will at all times, therefore, in their attempt to regain their normal unstressed form, be very tightly anchored to the head.

At 16, I show a rib formed in substantially longitudinal alignment with the plane surface of the handle to which the head is attached, to stiffen the head in this portion to prevent undue deflection of the head and consequent bending thereof, It will be noted by reference to the drawings that the tines are formed in two portions—first, a relatively long portion comprising the tine arms which project from the pockets 18 and loop 17, and a relatively short portion 22 disposed at an angle to the portion 20, the tines being bent in a curve at the junction of the two portions. This, of course, is done prior to the tempering of the steel or other material of which the tines are made.

Having thus described my invention in a preferred embodiment, I am aware that numerous and extensive departures may be made from the embodiments herein illustrated and described but without departing from the spirit thereof.

I claim:

1. In a broom rake, the combination with a handle, of a sheet metal head secured at an end to the handle, of a plurality of metallic loops integral with the head and deflected from a face thereof arranged in a substantially arcuate row, of a second row of metallic loops integral with the head and projected from the same face thereof arranged toward the handle relative to the first row, a plurality of flat elongated spring sheet steel tines, each projected through a loop of the first and a loop of the second row disposed with their openings in substantial alignment, said tines being held from longitudinal movement relative to the head by deformation of the material of the loops toward the position occupied thereby relative to the balance of the head material before deflection.

2. In a broom rake, the combination with a handle, of a sheet metal head secured at an end to the handle, of a plurality of metallic loops integral with the head and deflected from a face thereof arranged in a substantially arcuate row, of a second row of metallic loops integral with the head and projected from the same face thereof arranged toward the handle relative to the first row, a plurality of flat elongated spring sheet steel tines, each projected through a loop of the first and a loop of the second row disposed with their openings in substantial alignment, said tines being held from longitudinal movement relative to the head by deformation of the material of the loops toward the position occupied thereby relative to the balance of the head material before deflection, the loops of the second named row being integrally joined to the head at their edges disposed toward the handle.

3. In a broom rake, the combination with a handle, of a sheet metal head secured at an end to the handle, of a plurality of metallic loops carried by the head and deflected from a face thereof arranged substantially in a row extending transversely of the head, a plurality of resilient metallic strips forming tines, each projected through a different loop, said tines being deformed within the loops and held from longitudinal movement relative to the head by their deformation, and held to the deformed form by the constricting adjacent loop and head portions.

4. In a broom rake, the combination with a handle, of a sheet metal head supported thereby, of a plurality of metallic loops integral with the head and deflected from a face thereof arranged in a substantially transverse row, said head provided with a row of openings therethrough disposed in longitudinally spaced relation relative to the handle and to the loops, a plurality of flat elongated spring sheet steel tines, each projected through one of the openings and one of said loops, said tines being held from longitudinal movement relative to the head by deformation of the tines resiliently maintained by the loops.

5. In a broom rake, the combination with a handle, of a sheet metal head supported thereby and projected forwardly therefrom, of a plurality of metallic loops integral with the head and deflected from the face thereof arranged in a substantially transverse row, of a second row of metallic loops integral with the head and projected from the same face thereof arranged toward the handle relative to the first row, a plurality of flat elongated spring sheet steels tines, each projected through a loop of the first and a loop of the second row, each of said tines being held from longitudinal movement relative to the head by deformation resiliently maintained by one of its associated loops, and maintained in alignment by the lateral surfaces of its associated loops engaging with lateral edges of the tines.

6. In a broom rake, the combination with a handle, of a thin resilient sheet metal head of generally triangular form, of a plurality of metallic loops integral with the head and deflected from a face thereof arranged in a substantially arcuate row, a plurality of flat elongated spring sheet steel tines, each projected through a loop, said tines being held from longitudinal movement relative to the head by deformation of the tines maintained by permanently deformed portion of the loops, projected reentrantly toward the plane of the head.

7. In a broom rake, the combination with a handle, of a sheet metal cross head supported thereby, a plurality of flat spring steel tines carried by the cross head, said head provided with a plurality of like pairs of longitudinally disposed slits through each pair of which a corresponding end of one each of said tines are projected, each of said tines terminating at its inner end disposed towards the handle in an off-set end, and engageable with a bounding edge of the rearmost slit to restrain longitudinal movement of the tine, relative to the head.

8. In a broom rake, the combination with a handle, of a sheet metal cross head supported thereby, a plurality of flat spring steel rake tines, said cross head provided with at least two rows of tine receiving slits, each slit of the one row being so disposed as to receive a rake tine projected through a corresponding one of the slits of the other row, said rake tines projecting forwardly of the head and terminating in down turned ground engaging tips and at the other end in an off-set portion engageable with the cross head edges of the rearmost slit through which it is projected to restrain movement of the tines in a longitudinal direction relative thereto.

9. In a broom rake, the combination with a handle, of a sheet metal cross head supported thereby, a plurality of flat spring steel rake tines, said cross head provided with at least two rows of tine receiving slits, each slit of the one row being so disposed as to receive a rake tine projected through a corresponding one of the slits of the other row, said rake tines projecting forwardly of the head and terminating in down turned ground engaging tips and at the other end in an off-set portion engageable with the cross head edges of the rearmost slit through which it is projected to restrain movement of the tines in a longitudinal direction relative thereto, said tines extending in slightly divergent direction fan-wise from the head, the alignment of said slit pairs being similarly divergent relative to other pairs of slits.

In testimony whereof I hereunto affix my signature this 12th day of May, 1926.

WINTHROP WITHINGTON.